March 17, 1936.  H. GOSSLER  2,034,616

SIGNALING DEVICE FOR POWER VEHICLES

Filed Nov. 14, 1933

Inventor
Heinrich Goßler

By Fredrick Berg
Attorney

Patented Mar. 17, 1936

2,034,616

UNITED STATES PATENT OFFICE 2,034,616

SIGNALING DEVICE FOR POWER-VEHICLES

Heinrich Gossler, Mannheim, Germany

Application November 14, 1933, Serial No. 697,952
In Germany November 14, 1932

2 Claims. (Cl. 250—2)

The invention is directed to a signaling device designed more particularly for use in connection with automobiles or like road vehicles and serves to provide a means by which a following vehicle may signal to a leading vehicle as to a contemplated operation of the following vehicle in order that the driver of the leading vehicle may govern himself accordingly.

The invention contemplates an electrical transmitting set at the front of the vehicle and a receiving set at the rear of the vehicle. Through this provision on the respective vehicles, the driver of the following vehicle may, through its transmitting set, advise the driver of the leading vehicle through his receiving set as to any contemplated operation, particularly, for example, where the driver of the following vehicle intends to pass the leading vehicle and with the driver of the leading vehicle advised of this fact, there is less liability of accident or confusion.

The invention is illustrated in the accompanying drawing, in which.

Figure 1:
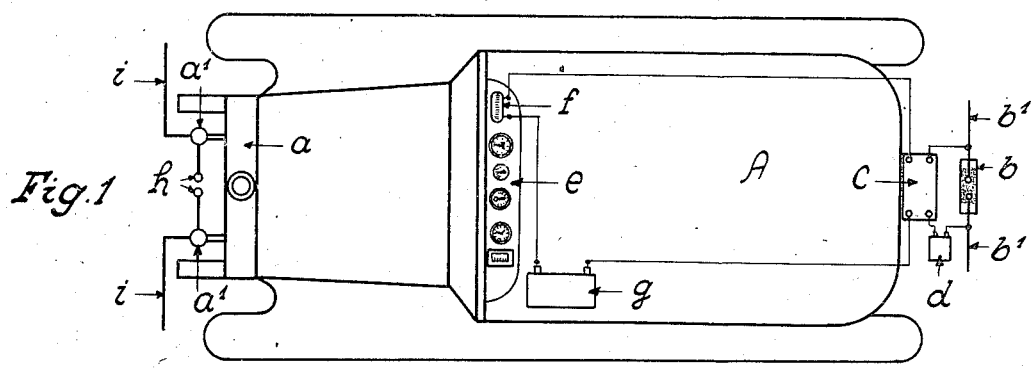
Figure 1 is a plan of an automobile showing the positions of the transmitting and receiving sets.

The receiving set shown in Figure 1 is arranged at the rear of the vehicle and includes conventionally a coherer $b$, a relay $c$ and a cell $d$, the latter being in circuit between the relay and coherer.

The coherer is conventionally constructed as a small glass tube carrying two metallic electrodes $b'$ having their adjacent terminals spaced apart the requisite distance, the space around the electrodes within the tube being filled with metallic particles presenting a high resistance, so that the battery $d$ is normally disconnected from the coherer, so far as current transmission is concerned.

At a place convenient to the driver, as for example the instrument board $e$, an optical or sound signal $f$ is arranged which is in series with the vehicle battery $g$ and the relay $c$.

Figure 2:
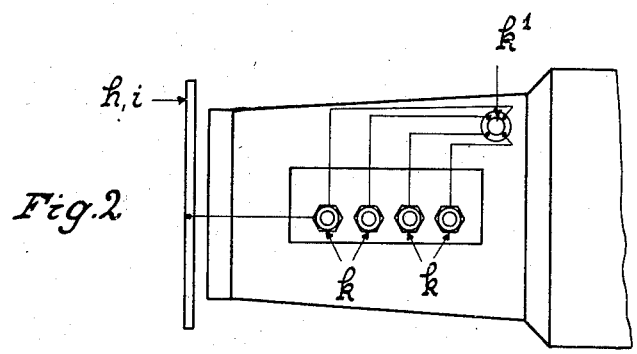
Figure 2 is a plan of the transmitting set utilizing the spark plugs for inducing the aerial.
Figure 3:
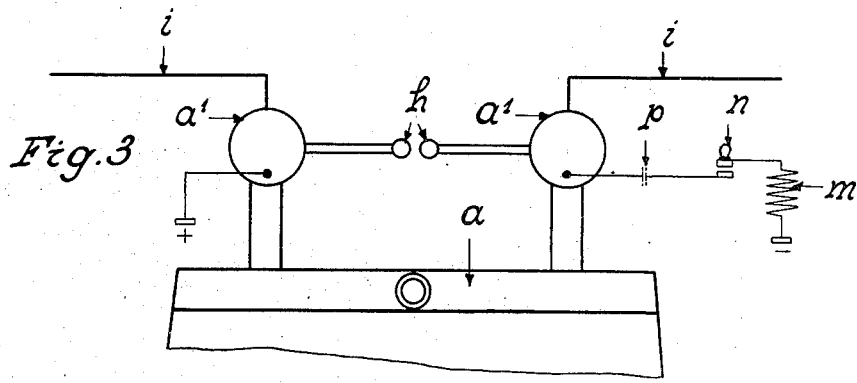
Figure 3 is a view in elevation of the transmitting set.

At the front of the vehicle, preferably in advance of the radiator $a$, a transmitting set is arranged having the electrodes $h$ and aerials $i$, with the electrodes and aerial mounted on insulated supports $a'$. In Figure 2, the transmitting set, indicated at $h'$, is operated by the spark plugs $k$ of the vehicle controlled by the electrical device $k'$. In Figure 3, the circuit includes a high tension coil $m$, a switch $n$ and a capacitance $p$, which parts are provided for the operation of the aerial and transmitting set.

Figure 4:
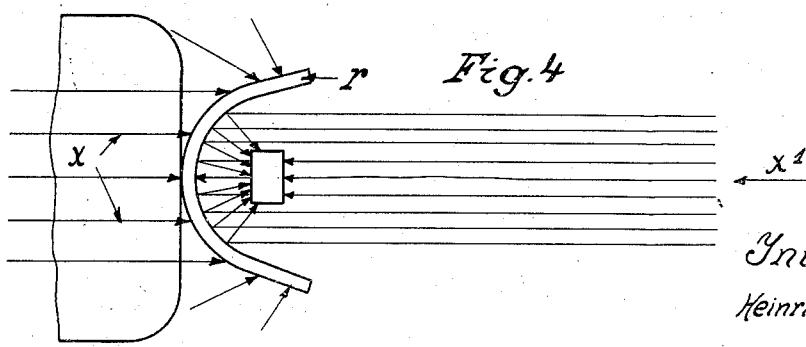
Figure 4 is a broken plan showing the use of a shielded receiving set.

In Figure 4, there is shown a metallic protecting element $r$ fixed on the rear of the vehicle and including within its protective area the entire receiving set. This element $r$ acts to shield the receiving set against disturbing waves coming from directions other than that of a transmitting set substantially directly in rear of the receiving set. This protection is indicated in Figure 4 as showing such disturbing waves by the arrows indicating electrical impulses or waves from other than the desired direction. Furthermore, the vehicle body itself serves as a more or less protective shield against otherwise disturbing waves coming from a direction in front of the vehicle.

The operation of the construction is as follows: The following vehicle, by reason of its transmitting set, sends the desired signal or information to the leading vehicle which, through its receiving apparatus and the signaling instrument $f$, is indicated to the driver of the leading vehicle.

If necessary, the coherer may, as is conventional, be provided with a beater for ascertaining current rupture after each broadcasting. The cell $d$ operating the coherer requires small energy only, whereas the battery $g$ operating the relay $c$ and the signaling device $f$ may be the regular automobile battery or a special battery for the purpose. The capacity of the receiving set may be increased by providing an aerial $b'$ connected with the coherer.

What I claim is:

1. A signaling device for automobiles for use when the automobiles are driven behind one another and the rear one is intending to drive ahead, comprising a wireless transmitting set on the front of the automobile, a wireless receiving set on the rear of the automobile, and a signaling means induced by the wireless receiving set, the body of the automobile shielding the receiving set against the influence of the transmitting set.

2. A signaling device for automobiles for use when the automobiles are driven one behind the other and the rear one is intending to drive ahead, including a transmitting set arranged in the forward part of the automobile, a receiving set arranged in the rear part of the automobile, a signaling means induced by the receiving set, and a shield carried by the rear part of the automobile for the receiving set to guard such receiving set against influence except from a position substantially in rear of the automobile.

HEINRICH GOSSLER.